April 28, 1942.     H. R. REYNOLDS ET AL     2,281,010
BEARING SEAL
Filed Jan. 6, 1940
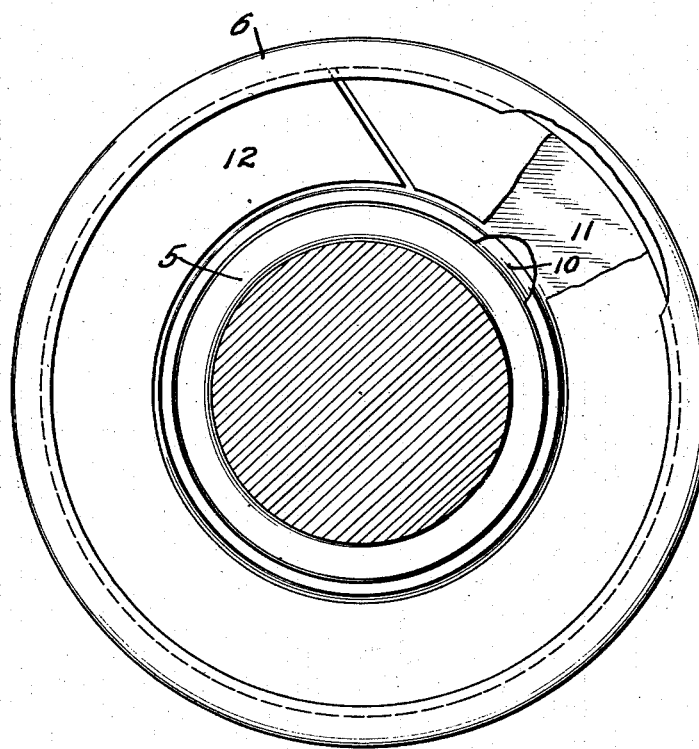
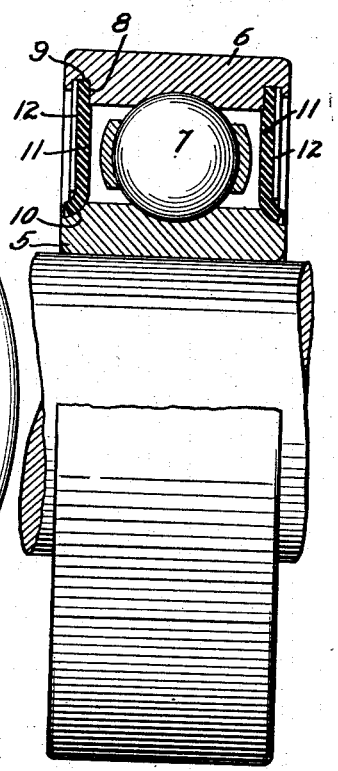
HARRY R. REYNOLDS
LADONACE A. HILLES
INVENTORS
BY
Mitchell Bechert
ATTORNEYS.

Patented Apr. 28, 1942

2,281,010

UNITED STATES PATENT OFFICE 2,281,010

BEARING SEAL

Harry R. Reynolds and Ladonace A. Hilles, New Britain, Conn., assignors to The Fafnir Bearing Company, New Britain, Conn., a corporation of Connecticut Application January 6, 1940, Serial No. 312,628

3 Claims. (Cl. 286—5)

Our invention relates to a bearing and more particularly to an improved seal therefor.

It is an object of the invention to provide an exceedingly simple, cheap, efficient seal for sealing lubricant in a bearing and excluding foreign matter therefrom.

Other objects and various features of invention and novelty will be hereinafter pointed out or will become apparent to those skilled in the art.

In the drawing which shows, for illustrative purposes only, a preferred form of the invention—

Fig. 1 is a view in end elevation of a bearing embodying the invention, parts being broken away to illustrate interior constructions;

Fig. 2 is an edge view in quarter section of the bearing shown in Fig. 1.

The bearing illustrated includes an inner bearing ring 5, an outer bearing ring 6, with interposed anti-friction bearing members such as balls 7 running in the usual raceway grooves of the rings.

We have devised an improved form of sealing means for tightly sealing the bearing against the egress of lubricant and the ingress of foreign matter. The bearing with its improved seal is particularly though not exclusively adapted for use on airplane controls where the relative rotation of the rings is quite slow and one of the principal requirements of the seal is to securely retain the lubricant and very effectively prevent the entrance of foreign matter, even when cleaning fluid, for example, is quite forcibly applied to the airplane and incidentally to the bearings. The seal is preferably of the contact type wherein a seal washer extends completely across the space between the two rings and is in sealing contact with both rings. The sealing washer is preferably bodily carried by one ring and is in oil impervious or sealing contact therewith and is in sliding sealing contact with the other ring. In the particular embodiment illustrated, the seal washer is carried bodily by the outer ring and is in sliding bearing contact with the inner ring.

In the illustrative form shown, the outer bearing ring at the edge is counterbored so as to provide a generally radially extending seat or abutment shoulder 8 constituting the bottom of the counterbore. Within the counterbore there is an annular undercut groove 9 facing in a direction toward the inner bearing ring. The inner ring in a location generally facing the counterbore is provided with a seal seat 10 which in the form shown is of arcuate form and the seal faces generally radially and axially outwardly. A seal washer 11, preferably of yielding oil impervious, non-metallic material, serves to seal the space between the two rings. The seal washer 11 may be conveniently formed of an oil impervious artificial rubber. The outer edge of the seal washer 11 is seated on the abutment shoulder or bottom 8 of the counterbore and the outer edge preferably extends into the undercut annular groove 9. The seal washer 11 is held in place preferably by means of a thin resilient split sheet metal washer 12, the outer edge of which is sprung into the groove 9 and the groove is of such width relatively to the combined widths of the seal washer 11 and split retaining washer 12 that the seal washer is compressed into relatively tight sealing engagement with the adjacent surface or surfaces of the outer bearing ring.

The seal washer 11 is of such width as to extend completely across the space between said inner and outer rings and the inner edge of the seal washer, due to its yielding character, is bent or deformed into tight sealing contact with the arcuate seat 10. The split retaining washer or ring 12 preferably extends substantially completely across the space between the rings and into relatively close proximity to the inner ring so as to quite securely hold the inner edge of the seal washer in sealing contact with its seat. While the seal washer 11 is in actual sealing contact with the inner ring, it will be seen that the resistance to rotation between the two rings will be relatively slight due to the thinness of the washer and the resilient character thereof and to the fact that the lubricant within the bearing will lubricate the surfaces between the seat 10 and the engaging portion of the seal washer 11. However, the sealing contact between the inner ring and the seal washer will be such as to effectively prevent the loss of lubricant and at the same time prevent the ingress of foreign matter. Even when liquids or fluids are quite forcibly shot against the outside of the seal, no opening will be provided for the ingress of such foreign matter. The force applied to the outside of the seal washer 11 will simply serve to urge the latter into tighter sealing contact with the inner ring and thus more effectively prevent ingress of foreign matter. The split ring or other holding means for the seal washer being preferably of sheet metal will serve to quite effectively protect the relatively thin yielding seal washer against mechanical or other injury. Where external fluid pressure on the bearing is high, a metal washer or plate similar to plate 12 but located just inside the seal 11, will be advantageous.

It will be seen that we have provided an exceedingly simple form of seal, highly effective for retaining lubricant and preventing the ingress of foreign matter. The seal is not only very cheap to manufacture but is very easy to apply and when desirable or necessary the seal may be readily removed for inspecting the bearing. In most cases it will be desirable to seal both sides of the bearing and we have shown duplicate seals at the sides of the bearing.

While the invention has been described in considerable detail and a preferred form illustrated, it is to be understood that various changes may be made within the scope of the invention as defined in the appended claims.

We claim:

1. In combination with a pair of relatively rotatable rings one within the other and held in radially spaced apart relationship and against substantial relative movement axially, the outer of said rings at one end having a generally axially outwardly facing abutment shoulder, an annular substantially flat seal disk of flexible and resilient lubricant-resistant rubber-like material seated at its outer edge on said abutment shoulder, said seal disk extending in a substantially radial direction completely across the space between said rings and at its inner edge being flexed into sealing engagement with a seating surface facing generally axially outwardly on the inner of said rings, said outer ring having a second shoulder facing generally axially inwardly, an annular securing disk split to render the same radially contractible snapped behind said last mentioned shoulder and abutting said annular seal disk to hold the latter in place in sealing engagement with said generally axially outwardly facing abutment shoulder, said securing disk lying on the outside of said seal disk and extending in a substantially radial direction from said outer ring toward said inner ring and terminating radially short of the radially outermost point of contact between said seal disk and its said seating surface on said inner ring whereby the distance between said securing disk and the point of contact of said seal disk and inner ring seating surface will be greater than the thickness of said seal disk, said securing disk serving to hold the inner edge of said seal disk flexed into and held by its inherent resiliency in sealing engagement with said inner ring seating surface as aforesaid.

2. In combination with a pair of relatively rotatable rings one within the other and held in radially spaced apart relationship and against substantial relative movement axially, seal means for the radial space between said rings, said seal means including an annular substantially flat seal disk formed of flexible and resilient lubricant-resistant non-metallic material, said annular seal disk being secured at one edge to and in lubricant sealing relationship with one of said rings and extending in a substantially radial direction across the radial space between said rings and at its other edge into running sealing engagement with a generally axially outwardly facing seat on the other of said rings, an annular securing disk lying against said seal disk at the outside thereof and secured to and serving to secure said seal disk to and in sealing relationship with said one of said rings, said securing disk being positioned to contact an intermediate portion of said seal disk so as to flex the free edge of said seal disk into sealing engagement with said seat as aforesaid, said free edge of said seal disk being held by its inherent resiliency in sealing engagement with its said seat, said securing disk having all points of contact with said sealing disk spaced from all points of contact between said sealing disk and said seat a radial distance greater than the thickness of said sealing disk.

3. In combination with a pair of relatively rotatable rings one within the other and held in radially spaced apart relationship and against substantial relative movement axially, said rings being positioned so as to terminate substantially in the same radial plane at one end, seal means for the radial space between said rings at said one end, said seal means including an annular disk formed of resilient and flexible lubricant-resistant non-metallic material seated at one of its edges adjacent the said one end of one of said rings and extending in a substantially radial direction across the space between said rings and at its other edge being flexed into and held by its inherent resiliency in sealing engagement with a generally axially outwardly directed seat on the second of said rings, a seal flexing disk secured to said one of said rings and located at the outer side of said seal disk and engaging an intermediate portion of said seal disk for flexing the latter into sealing engagement with said seat as aforesaid, said seal flexing disk having all points of contact with said seal disk spaced from all points of contact of said seal disk with said seat a radial distance greater than the thickness of said sealing disk, said seal disk and seal flexing disk being confined wholly between said rings and lying inwardly of said radial plane at the ends of said rings.

HARRY R. REYNOLDS.
LADONACE A. HILLES.